United States Patent
Takashima (10) Patent No.: US 10,516,534 B2
(45) Date of Patent: Dec. 24, 2019

(54) CRYPTOGRAPHIC SYSTEM AND KEY GENERATION APPARATUS

(71) Applicant: Mitsubishi Electric Corporation, Tokyo (JP)

(72) Inventor: Katsuyuki Takashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/562,344

(22) PCT Filed: Apr. 7, 2015

(86) PCT No.: PCT/JP2015/060825
§ 371 (c)(1),
(2) Date: Sep. 27, 2017

(87) PCT Pub. No.: WO2016/162941
PCT Pub. Date: Oct. 13, 2016

(65) Prior Publication Data
US 2018/0357933 A1   Dec. 13, 2018

(51) Int. Cl.
*H04L 9/30* (2006.01)
*G09C 1/00* (2006.01)
*H04L 9/06* (2006.01)

(52) U.S. Cl.
CPC ............. *H04L 9/3093* (2013.01); *G09C 1/00* (2013.01); *H04L 9/0618* (2013.01)

(58) Field of Classification Search
CPC ........... G09C 1/00; H04L 9/002; H04L 9/008; H04L 9/0816–0858;
(Continued)

(56) References Cited

U.S. PATENT DOCUMENTS 5,142,579 A    8/1992   Anderson
7,634,085 B1  12/2009   Sahai et al.
(Continued)

FOREIGN PATENT DOCUMENTS

JP   2010-273317 A   12/2010
JP   2011-124853 A    6/2011
(Continued)

OTHER PUBLICATIONS

Jonsson et al. Request for Comments: 3447, "Public-Key Cryptography Standards (PKCS) #1: RSA Cryptography Specifications Version 2.1", RSA Laboratories, Feb. 2003. (Year: 2003).*
(Continued)

*Primary Examiner* — Kevin Bechtel
(74) *Attorney, Agent, or Firm* — Birch, Stewart, Kolasch & Birch, LLP (57) ABSTRACT

A cryptographic system implements a functional encryption scheme that is based on the lattice theory. In the cryptographic system, a key generation apparatus generates, as a secret key $sk_v$ for a predicate vector v, a secret key $sk_v$ including a matrix e as a key element, wherein a product of the matrix e and a matrix $A_Y$ determined by the predicate vector v being input parameter Y forms a matrix $u_j$ for a value j in a set [N] including a plurality of values, the matrix $u_j$ being among a plurality of matrices u obtained from public parameters PP.

6 Claims, 9 Drawing Sheets (58) Field of Classification Search
CPC ..... H04L 9/0861–0877; H04L 9/14–16; H04L 9/30–3033; H04L 9/3093
See application file for complete search history.

(56) References Cited

U.S. PATENT DOCUMENTS

| | | |
|---|---|---|
| 8,559,638 B2 | 10/2013 | Takashima et al. |
| 8,577,030 B2 | 11/2013 | Takashima et al. |
| 8,913,742 B2 | 12/2014 | Takashima et al. |
| 8,938,623 B2 | 1/2015 | Takashima et al. |
| 2009/0080658 A1 | 3/2009 | Waters et al. |
| 2012/0045056 A1 | 2/2012 | Takashima et al. |
| 2012/0155635 A1* | 6/2012 | Vaikuntanathan .... H04L 9/0825 380/44 |
| 2012/0284530 A1 | 11/2012 | Takashima et al. |
| 2013/0028415 A1 | 1/2013 | Takashima et al. |
| 2013/0173929 A1 | 7/2013 | Takashima et al. |
| 2013/0216044 A1* | 8/2013 | Gentry ................... H04L 9/008 380/277 |

FOREIGN PATENT DOCUMENTS

| | | |
|---|---|---|
| JP | 2011-128609 A | 6/2011 |
| JP | 2011-232475 A | 11/2011 |
| JP | 2012-133214 A | 7/2012 |
| JP | 2012-249215 A | 12/2012 |
| JP | 2013-148822 A | 8/2013 |
| WO | WO 2014/083784 A1 | 6/2014 |

OTHER PUBLICATIONS

Abdalla et al., "Lattice-Based Hierarchical Inner Product Encryption", LATINCRYPT 2012, LNCS 7533, 2012, pp. 121-138.
Agrawal et al., "Functional Encryption for Inner Product Predicates from Learning with Errors", ASIACRYPT 2011, LNCS 7073, 2011, pp. 21-40.
Attrapadung et al., "Functional Encryption for Inner Product: Achieving Constant-Size Ciphertexts with Adaptive Security or Support for Negation", PKC 2010, LNCS 6056, 2010, pp. 384-402.
Gay et al., "Predicate Encryption for Multi-Dimensional Range Queries from Lattices", PKC 2015, 2015, pp. 1-24.
Katz et al., "Predicate Encryption Supporting Disjunctions, Polynomial Equations, and Inner Products", Journal of Cryptology, vol. 26, Issue 2, Apr. 2013, pp. 1-29.
Lewko et al., "Fully Secure Functional Encryption: Attribute-based Encryption and (Hierarchical) Inner Production Encryption", Advances in Cryptology—EUROCRYPT 2010, 2010, pp. 1-55.
Lewko et al., "New Techniques for Dual System Encryption and Fully Secure HIBE with Short Ciphertexts", Theory of Cryptography, TCC 2010, 2010, pp. 1-22.
Okamoto et al., "Adaptively Attribute-Hiding (Hierarchical) Inner Product Encryption", EUROCRYPT 2012, the 31st International Conference on the Theory and Applications of Cryptographic Techniques, Apr. 15-19, 2012, pp. 1-39.
Okamoto et al., "Fully Secure Functional Encryption with General Relations from the Decisional Linear Assumption", Advances in Cryptology—CRYPTO 2010, LNCS 6223, 2010, pp. 1-65.
Okamoto et al., "Hierarchical Predicate Encryption for Inner-Products", ASIACRYPT 2009, LNCS 5912, 2009, pp. 214-231.
Waters, "Dual System Encryption: Realizing Fully Secure IBE and HIBE under Simple Assumptions", Advances in Cryptology—CRYPTO 2009, 2009, pp. 1-38.
Xagawa et al., "Improved (Hierarchical) Inner-Product Encryption from Lattices", PKC 2013, 2013, pp. 1-25.
European Office Action (Communication pursuant to Article 94(3) EPC) dated Oct. 5, 2018 in corresponding European Application No. 15 888 435.3.
Office Action dated Nov. 5, 2019 in corresponding Indian Application No. 201747033474.

* cited by examiner

CRYPTOGRAPHIC SYSTEM AND KEY GENERATION APPARATUS

TECHNICAL FIELD

The present invention relates to a functional encryption scheme based on the lattice theory.

BACKGROUND ART

Non-Patent Literatures 1 to 3 describe functional encryption schemes based on the lattice theory. The functional encryption schemes described in Non-Patent Literatures 1 to 3 are based on the lattice theory and thus durable against a quantum computer.

CITATION LIST

Patent Literature

Non-Patent Literature 1: Shweta Agrawal, David Mandell Freeman, and Vinod Vaikuntanathan. Functional encryption for inner product predicates from learning with errors. In Advances in Cryptology—ASIACRYPT 2011-17th International Conference on the Theory and Application of Cryptology and Information Security, Seoul, South Korea, Dec. 4-8, 2011. Proceedings, pages 21-40, 2011.

Non-Patent Literature 2: Michel Abdalla, Angelo De Caro, and Karina Mochetti. Lattice-based hierarchical inner product encryption. In Progress in Cryptology—LATIN-CRYPT 2012-2nd International Conference on Cryptology and Information Security in Latin America, Santiago, Chile, Oct. 7-10, 2012. Proceedings, pages 121-138, 2012.

Non-Patent Literature 3: Keita Xagawa. Improved (hierarchical) inner-product encryption from lattices. In Public-Key Cryptography—PKC 2013-16th International Conference on Practice and Theory in Public-Key Cryptography, Nara, Japan, Feb. 26-Mar. 1, 2013. Proceedings, pages 235-252, 2013.

SUMMARY OF INVENTION

Technical Problem

The functional encryption schemes described in Non-Patent Literatures 1 to 3 are weakly attribute-hiding. That is, with the functional encryption schemes described in Non-Patent Literatures 1 to 3, information may leak undesirably from a ciphertext having an attribute that satisfies a condition for a secret key.

It is an object of the present invention to prevent undesirable leakage of information from a ciphertext having an attribute that satisfies a condition for a secret key.

Solution to Problem

A cryptographic system according to the present invention includes:

a key generation apparatus to generate, as a secret key for an input parameter Y, a secret key including a matrix e as a key element, wherein a product of the matrix e and a matrix $A_Y$ determined by the input parameter Y forms a matrix $u_j$ for a value j in a set [N] including a plurality of values, the matrix $u_j$ being among a plurality of matrices u obtained from public parameters PP;

an encryption apparatus to generate a ciphertext including cipher elements for respective values included in the set [N]; and a decryption apparatus to decrypt the ciphertext with using the secret key and the cipher element for the value j among cipher elements included in the ciphertext.

Advantageous Effects of Invention

The present invention generates a secret key which includes as a key element a matrix e whose product with a matrix $A_Y$ forms a matrix $u_3$ for a value j included in a set N. Hence, it is possible to prevent undesirable leakage of information from a ciphertext having an attribute that satisfies a condition for a secret key.

DESCRIPTION OF EMBODIMENTS

Embodiment 1

In Embodiment 1, first, a key technique for achieving full attribute-hiding will be described with which information will not leak undesirably from a ciphertext having an attribute that satisfies a condition for a secret key. Then, an encryption scheme to which the key technique is applied will be described.

In Embodiment 1, a scheme obtained by applying the key technique to the functional encryption scheme described in Non-Patent Literature 1 will be described. The key technique can also be applied to the functional encryption schemes described in Non-Patent Literatures 2, 3, and so on.

\*\*\*Key Technique\*\*\*

According to the functional encryption based on the lattice theory, in the generation of a secret key related to an input parameter Y, a secret key is generated which has as a key element a matrix e that satisfies a matrix target equation "$A_Y e = u$" for a matrix $A_Y$ determined by the input parameter Y, a matrix u obtained from public parameters PP, and a matrix e having a norm shorter than that of the matrix $A_Y$ and that of the matrix u.

In Embodiment 1, a secret key having as a key element a matrix e that satisfies a matrix target equation "$A_Y e = u_j$" is generated with using, among matrices u obtained from the public parameters PP, a matrix $u_j$ for a value j selected from a set N including a plurality of values.

In encryption, which value in the set N is selected as the value j cannot be identified. Therefore, a ciphertext including cipher elements for the values included in the set N is generated. In decryption, the ciphertext is decrypted with using the cipher element for the value j and the secret key.

\*\*\*Description of Configuration\*\*\*

Figure 1:
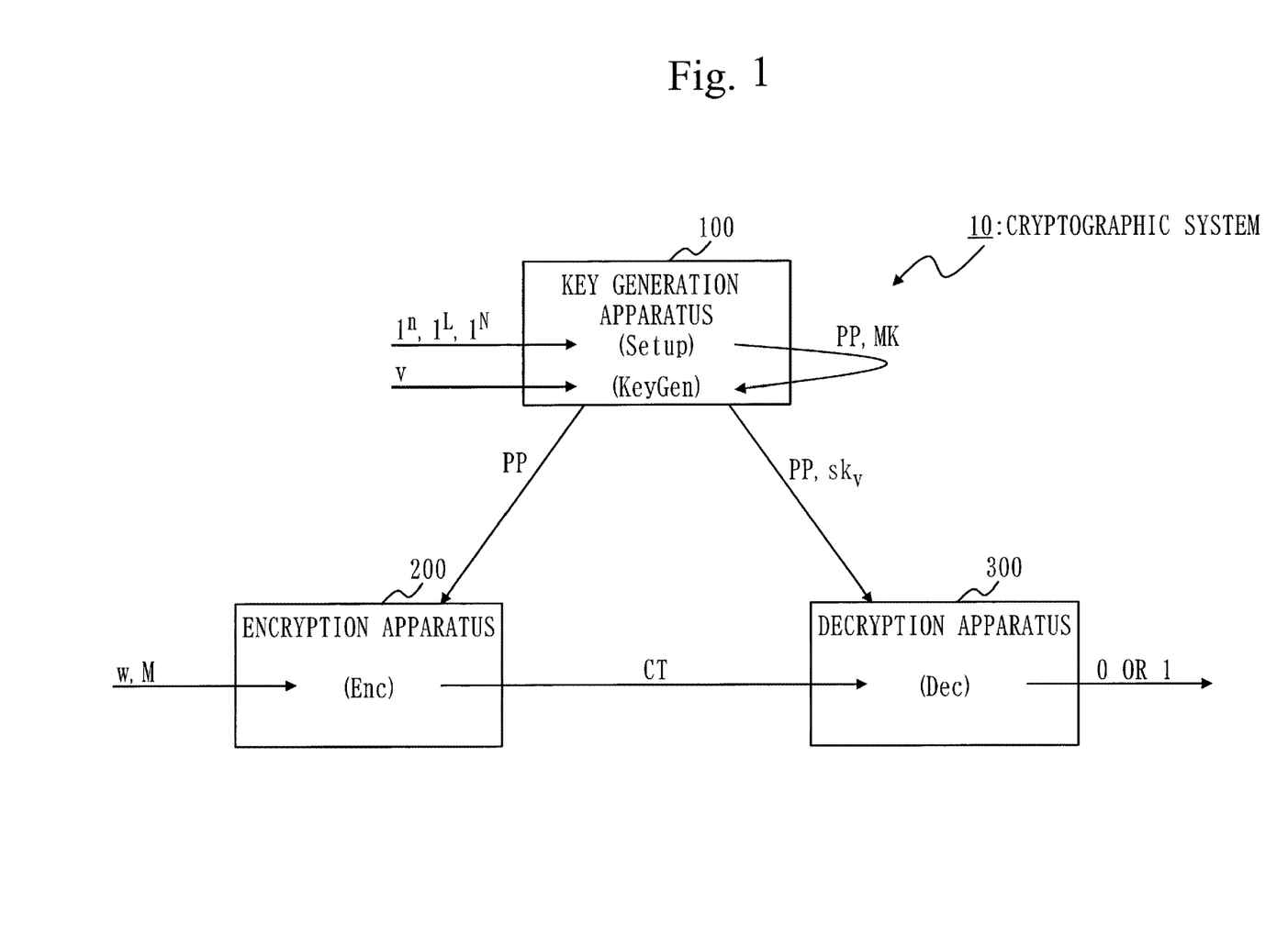
FIG. 1 is a configuration diagram of a cryptographic system 10 according to Embodiment 1.

The configuration of a cryptographic system 10 according to Embodiment 1 will be described with reference to FIG. 1.

The cryptographic system 10 is provided with a key generation apparatus 100, an encryption apparatus 200, and a decryption apparatus 300.

The key generation apparatus 100 takes as input $1^n$, $1^L$, and $1^N$ being parameters and executes Setup algorithm, to generate the public parameters PP and a master key MK. The key generation apparatus 100 also takes as input the public parameters PP, the master key MK, and a predicate vector v being the input parameter Y, and executes KeyGen algorithm, to generate a secret key $sk_v$ for the predicate vector v.

Setup algorithm is executed once at the time of system set up or the like. KeyGen algorithm is executed each time a secret key $sk_v$ is generated. An apparatus that executes Setup algorithm and an apparatus that executes KeyGen algorithm may be different apparatuses.

The encryption apparatus 200 takes as input the public parameters PP generated by the key generation apparatus 100, an attribute vector w, and a 1-bit message M expressing 0 or 1, and executes Enc algorithm, to generate a ciphertext CT.

The decryption apparatus 300 takes as input the public parameters PP and secret key $sk_v$ generated by the key generation apparatus 100, and the ciphertext CT generated by the encryption apparatus 200, and executes Dec algorithm, to output 0 or 1.

Figure 2:
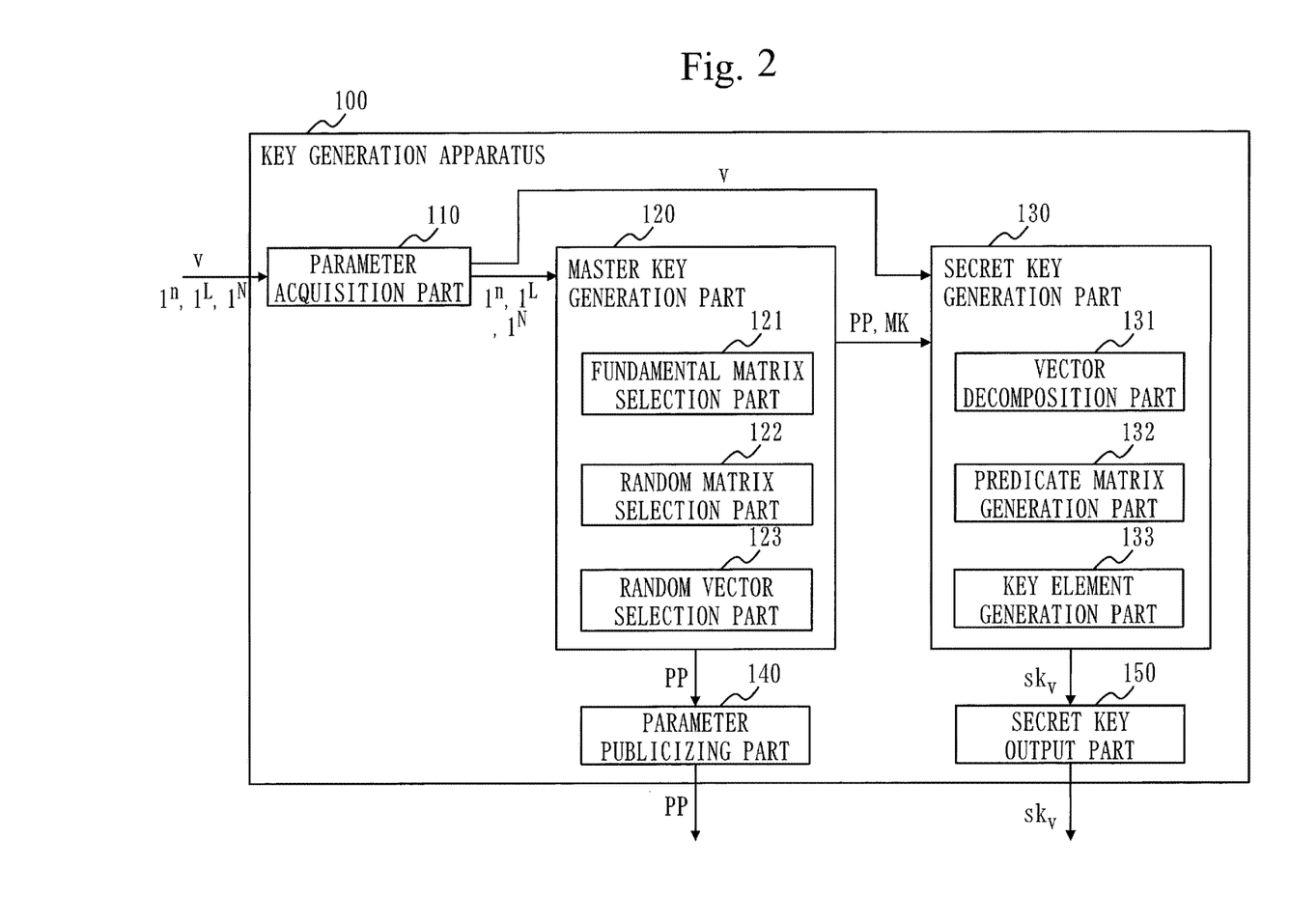
FIG. 2 is a configuration diagram of a key generation apparatus 100 according to Embodiment 1.

The configuration of the key generation apparatus 100 according to Embodiment 1 will be described with reference to FIG. 2.

The key generation apparatus 100 is provided with a parameter acquisition part 110, a master key generation part 120, a secret key generation part 130, a parameter publicizing part 140, and a secret key output part 150.

The parameter acquisition part 110 acquires $1^n$, $1^L$, and $1^N$ which are parameters and inputted by the administrator of the cryptographic system 10.

The parameter acquisition part 110 acquires the predicate vector v inputted by the administrator of the cryptographic system 10. Note that the predicate vector v indicates the attribute of the user of the secret key sky.

The master key generation part 120 takes as input $1^n$, $1^L$, and $1^N$ acquired by the parameter acquisition part 110, and executes Setup algorithm, to generate the public parameters PP and the master key MK.

The master key generation part 120 is provided with a fundamental matrix selection part 121, a random matrix selection part 122, and a random vector selection part 123.

The secret key generation part 130 takes as input the public parameters PP and master key MK generated by the master key generation part 120, and the predicate vector v acquired by the parameter acquisition part 110, and executes KeyGen algorithm, to generate the secret key $sk_v$ for the predicate vector v.

The secret key generation part 130 is provided with a vector decomposition part 131, a predicate matrix generation part 132, and a key element generation part 133.

The parameter publicizing part 140 publicizes the public parameters PP generated by the master key generation part 120.

In this case, the parameter publicizing part 140 transmits the public parameters PP to a publicizing server to make the public parameters PP accessible via the internet or intranet, thereby publicizing the public parameters PP. The public parameters PP may be publicized by another method such as transmitting the public parameters PP to the encryption apparatus 200 and the decryption apparatus 300.

The secret key output part 150 outputs the secret key $sk_v$ generated by the secret key generation part 130 to the decryption apparatus 300 in secrecy.

In this case, the secret key output part 150 encrypts the secret key $sk_v$ by some or other encryption scheme and transmits the encrypted secret key $sk_v$ via the network, thereby outputting the secret key $sk_v$ in secrecy. The secret key $sk_v$ may be outputted to the decryption apparatus 300 in secrecy by another method such as storing the secret key $sk_v$ to a storage medium and then delivering the storage medium to the decryption apparatus 300.

Figure 3:
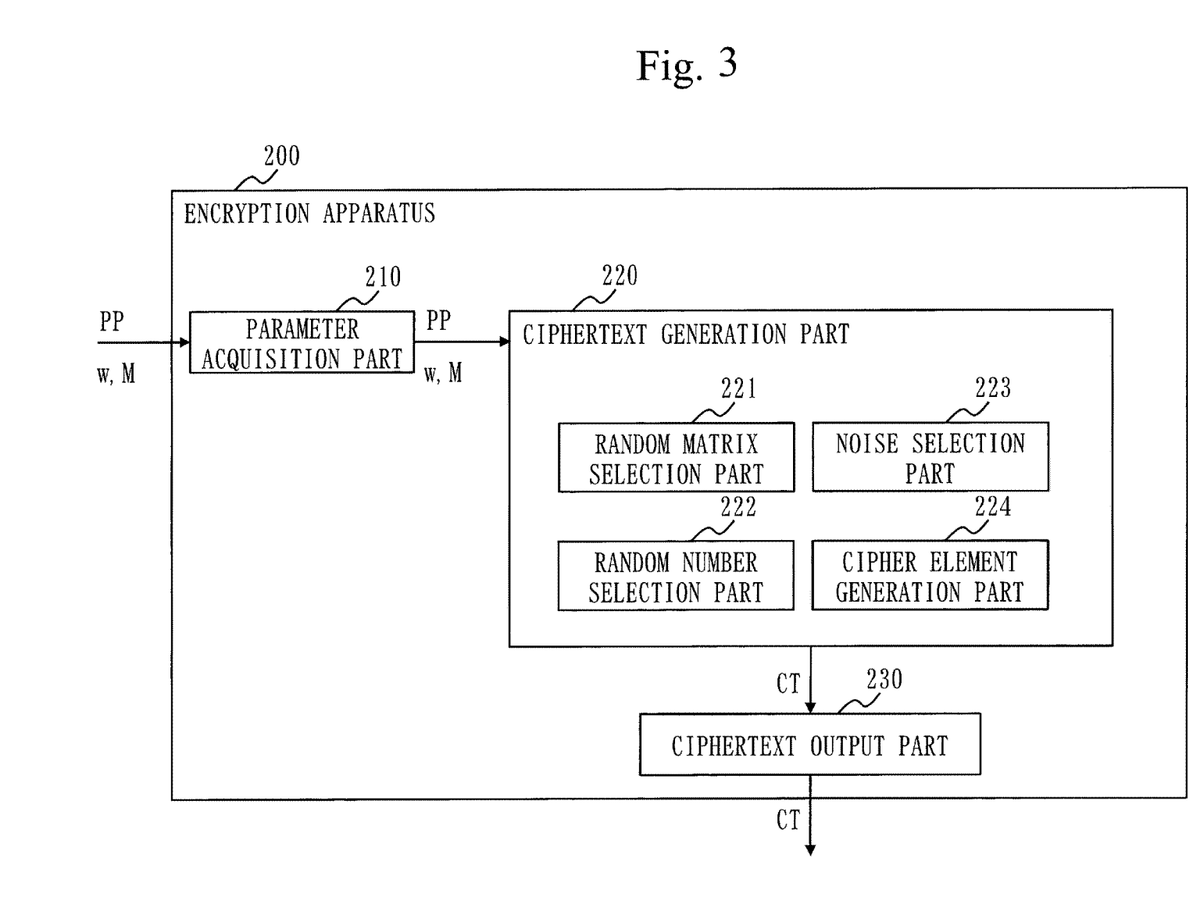
FIG. 3 is a configuration diagram of an encryption apparatus 200 according to Embodiment 1.

The configuration of the encryption apparatus 200 according to Embodiment 1 will be described with reference to FIG. 3.

The encryption apparatus 200 is provided with a parameter acquisition part 210, a ciphertext generation part 220, and a ciphertext output part 230.

The parameter acquisition part 210 acquires the public parameters PP generated by the key generation apparatus 100.

The parameter acquisition part 210 acquires the attribute vector w and message M inputted by the user of the encryption apparatus 200. In this case, the attribute vector w indicates the attribute of the user who can decrypt the ciphertext CT. The message M is a 1-bit value expressing 0 or 1.

The ciphertext generation part 220 takes as input the public parameters PP, attribute vector w, and message M acquired by the parameter acquisition part 210, and executes Enc algorithm, to generate the ciphertext CT.

The ciphertext generation part 220 is provided with a random matrix selection part 221, a random number selection part 222, a noise selection part 223, and a cipher element generation part 224.

The ciphertext output part 230 outputs the ciphertext CT generated by the ciphertext generation part 220 to the decryption apparatus 300.

In this case, the ciphertext output part 230 transmits the ciphertext CT to the decryption apparatus 300 via the network, thereby outputting the ciphertext CT to the decryption apparatus 300. The ciphertext CT may be outputted to the decryption apparatus 300 by another method such as storing the ciphertext CT to a storage medium and then delivering the storage medium to the decryption apparatus 300.

Figure 4:
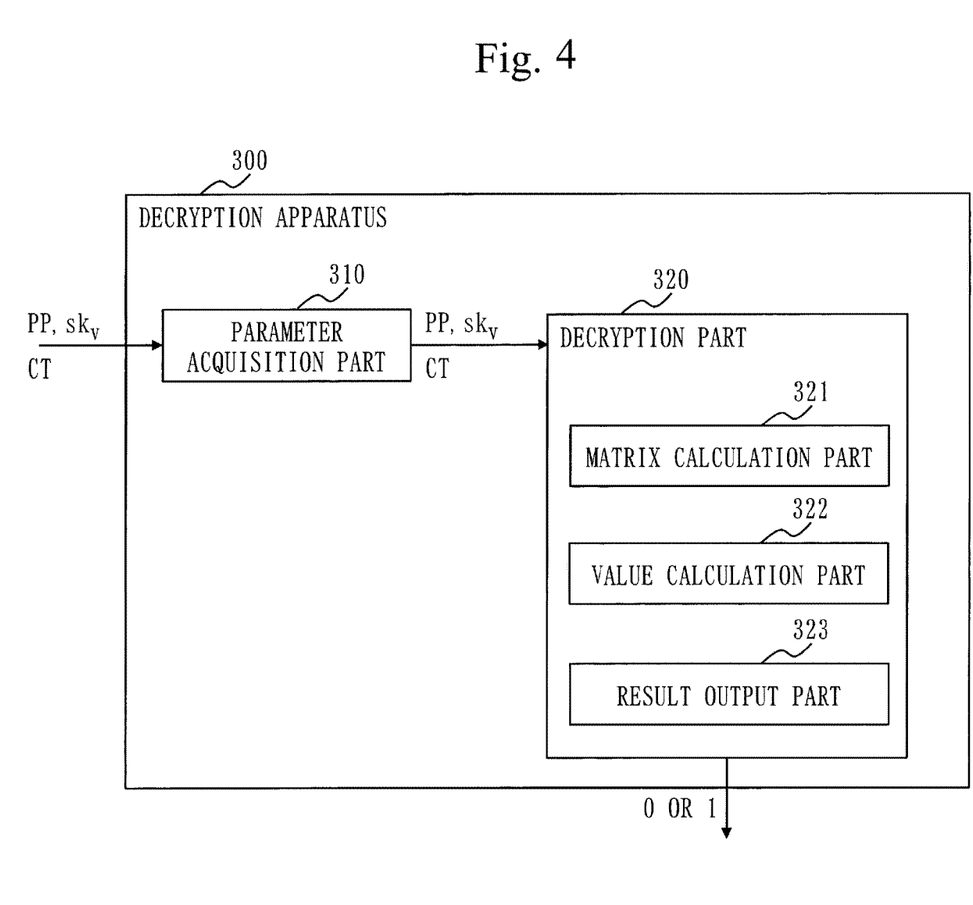
FIG. 4 is a configuration diagram of a decryption apparatus 300 according to Embodiment 1.

The configuration of the decryption apparatus 300 according to Embodiment 1 will be described with reference to FIG. 4.

The decryption apparatus 300 is provided with a parameter acquisition part 310 and a decryption part 320.

The parameter acquisition part 310 acquires the public parameters PP and secret key $sk_v$ generated by the key generation apparatus 100.

The parameter acquisition part 310 acquires the ciphertext CT generated by the encryption apparatus 200.

The decryption part 320 takes as input the public parameters PP, secret key sky, and ciphertext CT acquired by the parameter acquisition part 310, and executes Dec algorithm, to output 0 or 1. Namely, the decryption part 320 outputs a result obtained by decrypting the ciphertext CT with using the secret key sky.

The decryption part 320 is provided with a matrix calculation part 321, a value calculation part 322, and a result output part 323.

\*\*\*Description of Operation\*\*\*

The operation of the cryptographic system 10 according to Embodiment 1 will be described with reference to FIGS. 5 to 8.

The operation of the cryptographic system 10 according to Embodiment 1 corresponds to an encryption method according to Embodiment 1. The operation of the cryptographic system 10 according to Embodiment 1 also corresponds to the process of an encryption program according to Embodiment 1.

Figure 5:
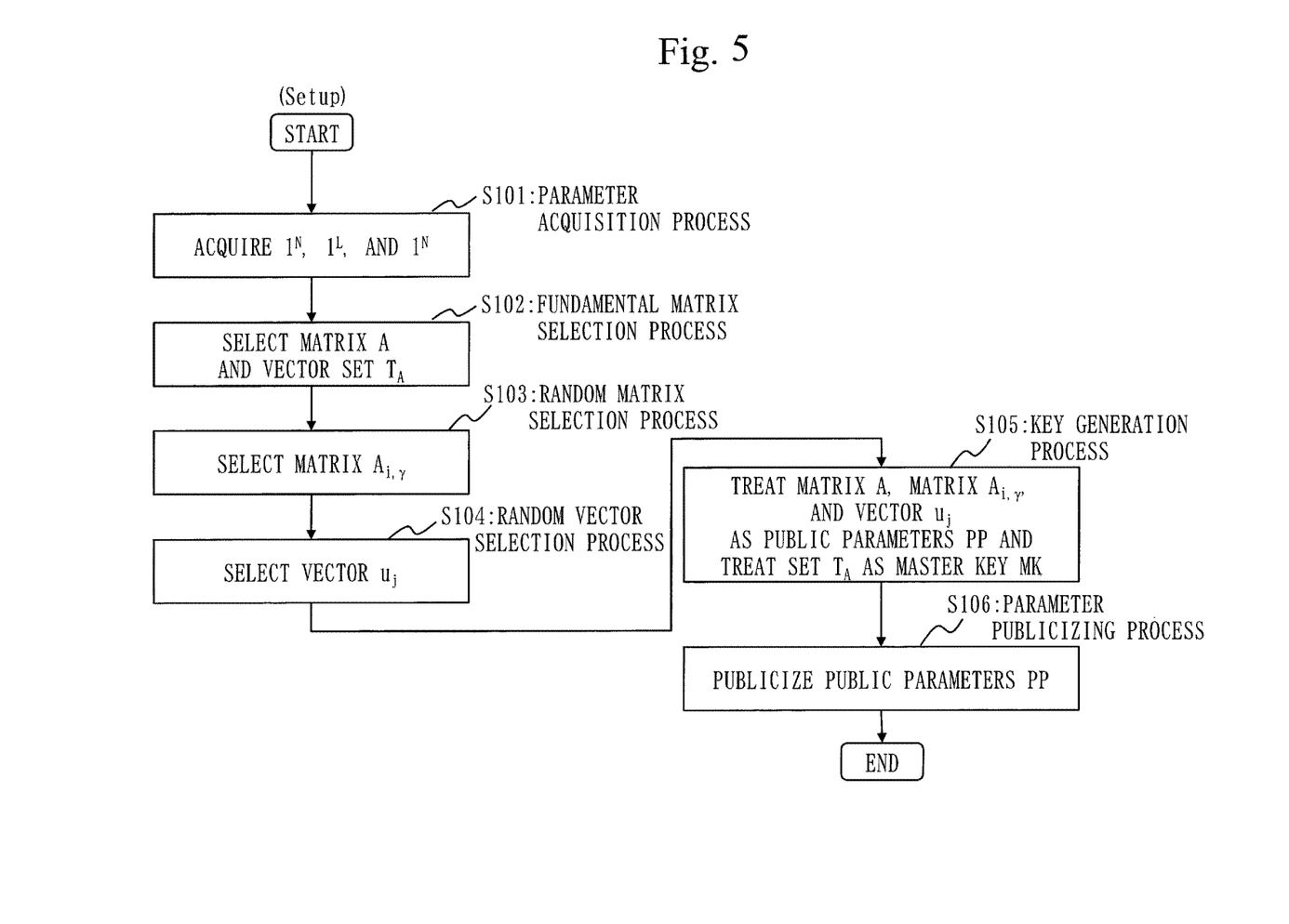
FIG. 5 is a flowchart illustrating a process of Setup algorithm according to Embodiment 1.

The process of Setup algorithm according to Embodiment 1 will be described with reference to FIG. 5.

As described above, Setup algorithm is executed by the key generation apparatus 100.

In a parameter acquisition process of S101, the parameter acquisition part 110 acquires the parameters $1^n$, $1^L$, and $1^N$ which will be inputted to the Setup algorithm.

Note that n is a security parameter and is an integer not smaller than 1. L is an integer not smaller than 1 and indicating the length of the predicate vector v and attribute vector w. N is an integer not smaller than 2.

In the following description, note that q is an integer larger than 2 and that m is an integer larger than n. Also note that a and a are each a positive real-number Gaussian parameter.

In a fundamental matrix selection process of S102, the fundamental matrix selection part 121 selects a matrix $A \in Z_q^{n \times m}$ together with a maximum rank set $T_A$ of the vector as indicated by formula 11. With using TrapGen algorithm described in Non-Patent Literature 1, the fundamental matrix selection part 121 is capable of selecting the matrix A and the maximum rank set $T_A$ of the vector.

$$T_A \subset \Lambda_q^\perp(A) \text{ such that } \|\tilde{T}_A\| \leq m \cdot \omega \sqrt{\log m} \quad \text{[Formula 11]}$$

Note that $\tilde{T}_A$ is Gram-Schmidt orthonormalized $T_A$, $\omega$ is a symbol representing asymptotic lower bound, and $\omega(\sqrt{\log m})$ is equal to or slightly larger than $\sqrt{\log m}$.

In a random matrix selection process of S103, the random matrix selection part 122 selects L·(k+1) pieces of uniformly random matrices $A_{i,\gamma} \in Z_q^{n \times m}$ for integers i satisfying i=1, ..., L and integers γ satisfying γ=0, ..., k.

Note that $Z_q$ signifies an integer space modulo q, and that a in $Z_q^a$ represents the number of elements. Hence, the matrices $A_{i,\gamma} \in Z_q^{n \times m}$ signify n-row, m-column matrices in the integer space modulo q.

In a random vector selection process of S104, the random vector selection part 123 selects j pieces of uniformly random vectors $u_j \in Z_q^n$ for integers j satisfying j=1, ..., N.

In a key generation process of S105, the master key generation part 120 treats the matrix A, L·(k+1) pieces of random matrices $A_{i,\gamma}$, and j pieces of vectors $u_j$ generated in S102 through S104, as the public parameters PP. The master key generation part 120 also treats the vector set $T_A$ generated in S102, as the master key MK.

In a parameter publicizing process of S106, the parameter publicizing part 140 publicizes the public parameters PP generated in S105.

Figure 6:
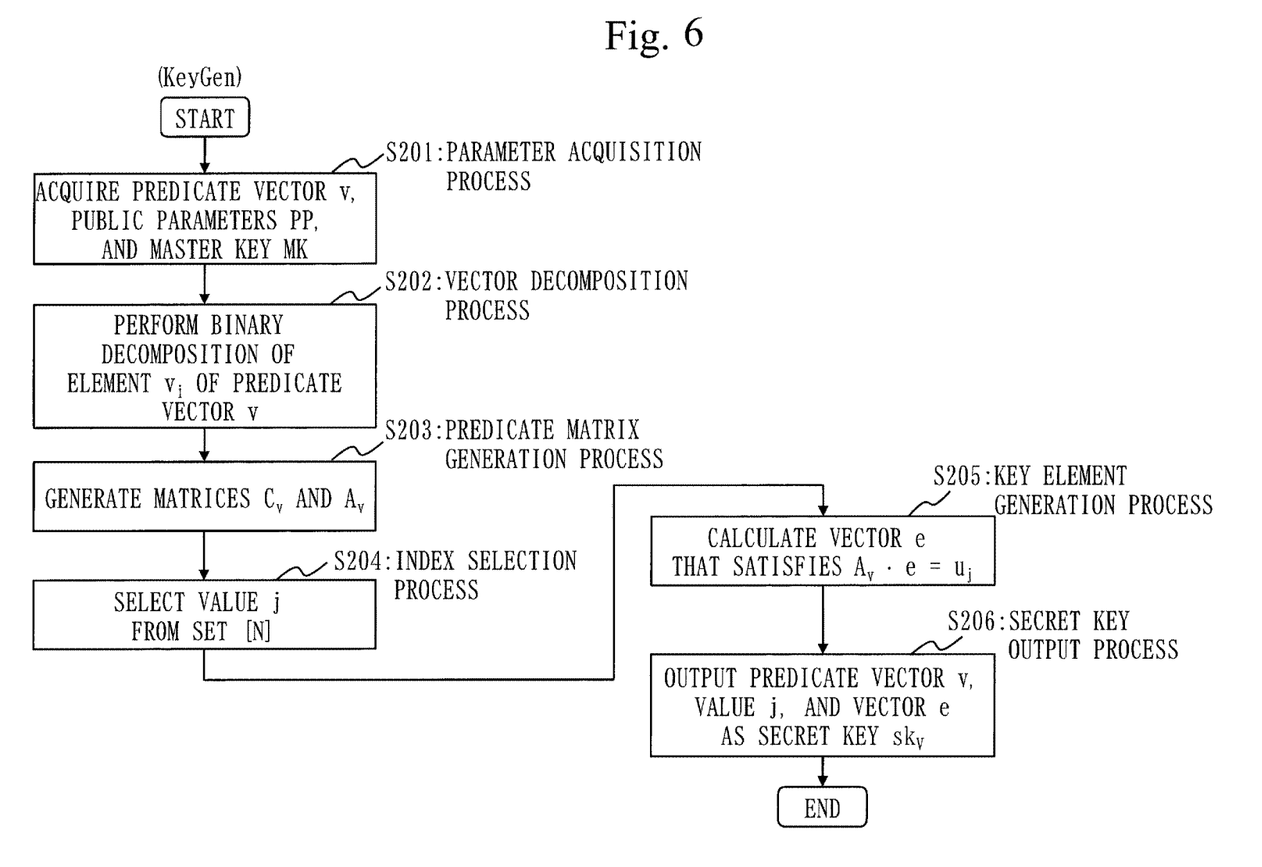
FIG. 6 is a flowchart illustrating a process of KeyGen algorithm according to Embodiment 1.

The process of KeyGen algorithm according to Embodiment 1 will be described with reference to FIG. 6.

As described above, KeyGen algorithm is executed by the key generation apparatus 100.

In a parameter acquisition process of S201, the parameter acquisition part 110 acquires a predicate vector $v:=(v_1, \ldots, v_L) \in Z_q^L$. The secret key generation part 130 acquires the public parameters PP and master key MK generated by the master key generation part 120.

In a vector decomposition process of S202, the vector decomposition part 131 performs binary decomposition of an element $v_i$ of the predicate vector v for each integer i satisfying i=1, ..., L, as indicated by formula 12.

$$v_i = \sum_{\gamma=0}^{k} v_{i,\gamma} \cdot 2^\gamma \quad \text{[Formula 12]}$$

Note that $v_{i,\gamma}$ is 0 or 1.

In a predicate matrix generation process of S203, the predicate matrix generation part 132 generates a matrix $C_v$ and a matrix $A_v$ as indicated by formula 13 with using the value $v_{i,\gamma}$ generated by decomposition in S202 and the matrix $A_{i,\gamma}$ included in the public parameters PP acquired in S201.

$$C_v := \sum_{i=1}^{L} \sum_{\gamma=0}^{k} v_{i,\gamma} A_{i,\gamma} \in Z_q^{n \times m}, \quad \text{[Formula 13]}$$

$$A_v := [A \| C_v] \in Z_q^{n \times 2m}$$

Since the input parameter Y is the predicate vector v, the matrix $A_v$ is the matrix $A_Y$ described regarding the key technique.

In an index selection process of S204, the key element generation part 133 selects the value j randomly from among values included in the set [N]:=1, ..., N.

In a key element generation process of S205, the key element generation part 133 calculates, for the value j selected in S204, a vector e whose product with the matrix $A_v$ forms the vector $u_j$, namely, a vector e which satisfies $A_v \cdot e = u_j \mod q$.

In this case, the key element generation part 133 takes as input the matrix A included in the public parameters PP acquired in S201, the matrix $C_v$ generated in S203, the set $T_A$ being the master key MK, the vector $u_j$ included in the public parameters PP, and the Gaussian parameter σ, and executes SampleLeft algorithm, to calculate the vector e randomly. SampleLeft algorithm is described in Non-Patent Literature. A method other than SampleLeft algorithm may be employed as far as it can calculate the vector e.

In a secret key output process of S206, the secret key output part 150 outputs the secret key $sk_v$ having as the key elements the predicate vector v acquired in S201, the value j selected in S204, and the vector e calculated in S205.

Figure 7:
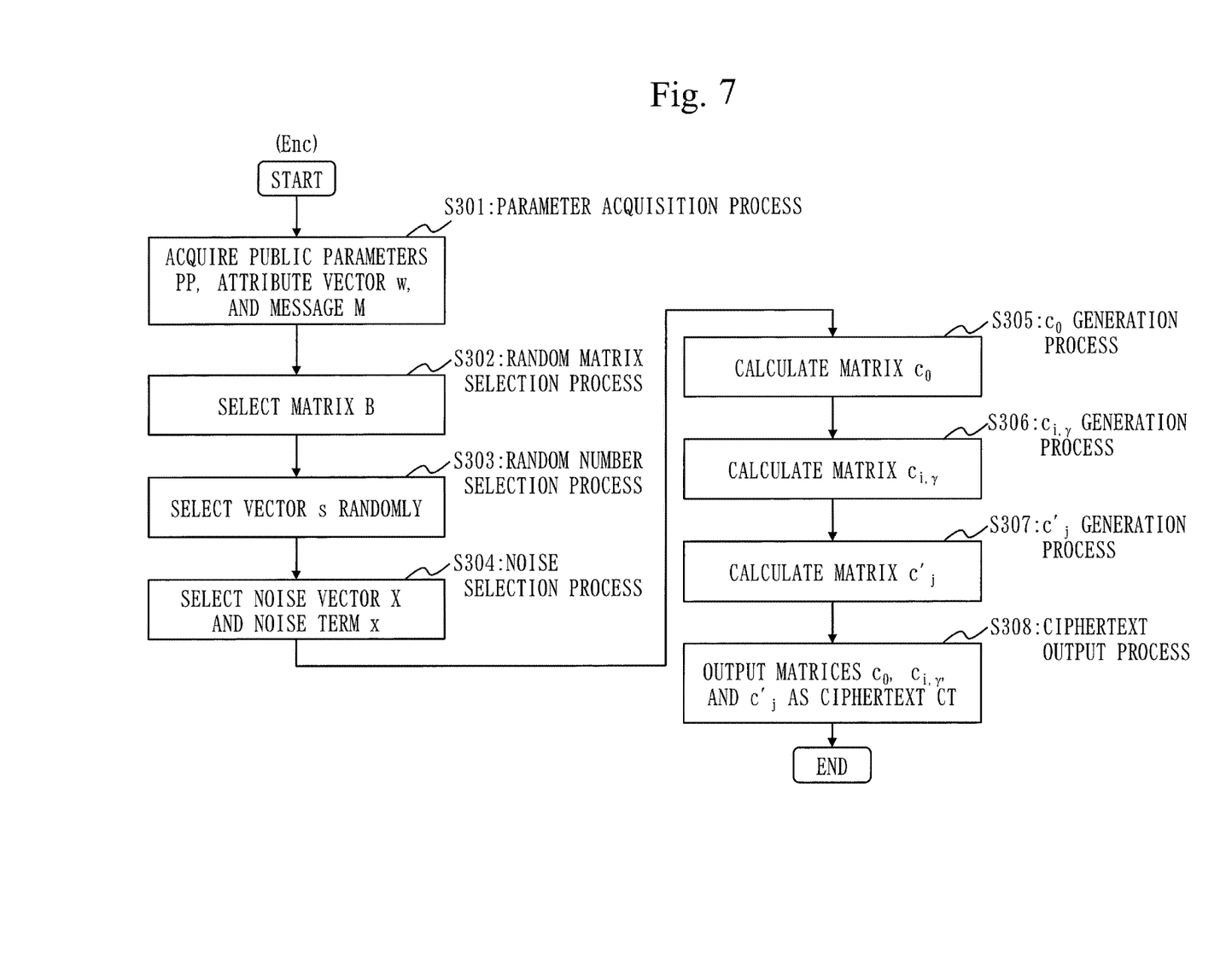
FIG. 7 is a flowchart illustrating a process of Enc algorithm according to Embodiment 1.

The process of Enc algorithm according to Embodiment 1 will be described with reference to FIG. 7.

As described above, Enc algorithm is executed by the encryption apparatus 200.

In a parameter acquisition process of S301, the parameter acquisition part 210 acquires the public parameters PP publicized by the parameter publicizing part 140. The parameter acquisition part 210 also acquires the attribute vector $w:=(w_1, \ldots, w_L)$ and the message $M \in \{0, 1\}$.

In a random matrix selection process of S302, the random matrix selection part 221 selects a uniformly random matrix $B \in Z_q^{n \times m}$.

In a random number selection process of S303, the random number selection part 222 selects a vector $s \in Z_q^n$ randomly.

In a noise selection process of S304, the noise selection part 223 selects a noise level X having m pieces of elements from a probability distribution $\phi_\alpha$ randomly, and selects a noise term x from the probability distribution $\phi_\alpha$ randomly.

The probability distribution $\phi_\alpha$ is a probability distribution over $Z_q := Z/qZ$ and $Z_q$ is obtained by generating a real number x from a normal distribution (Gaussian distribution) which has an average of 0 for $\alpha \in (0,1)$ and an integer q larger than 2 and which has a standard deviation of $\alpha/\sqrt{(2\pi)}$, and by outputting an integer that is the closest to qx.

In a $c_0$ generation process of S305, the cipher element generation part 224 calculates a matrix $c_0$ by $c_0 := A^T s + X$ with using the matrix A included in the public parameters PP acquired in S301, the vector s selected in S303, and the noise vector X generated in S304.

In a $c_{i,\gamma}$ generation process of S306, the cipher element generation part 224 executes following (a) and (b) for each integer i satisfying $i=1, \ldots, L$ and each integer $\gamma$ satisfying $\gamma=0, \ldots, k$.

(a) The cipher element generation part 224 selects a random matrix $R_{i,\gamma} \in \{0, 1\}^{m \times m}$. (b) The cipher element generation part 224 calculates a matrix $c_{i,\gamma}$ by $c_{i,\gamma} := (A_{i,\gamma} + 2^\gamma w_i B)^T s + R_{i,\gamma}^R X$ with using the matrix $A_{i,\gamma}$ included in the public parameters PP acquired in S301, the attribute vector w acquired in S301, the matrix B selected in S302, the vector s selected in S303, and the noise vector X generated in S304.

In a $c'_j$ generation process of S307, the cipher element generation part 224 calculates a matrix $c'_j$ for each integer j satisfying $j=1, \ldots, N$, by $c'_j := u_j^T s + x + M \cdot \text{"}q/2\text{"} \in Z_q$ with using the vector $u_j$ included in the public parameters PP acquired in S301, the vector s selected in S303, the noise term x selected in S304, and the message M acquired in S301. Namely, the cipher element generation part 224 calculates the matrix $c'_j$ for each value included in the set [N].

Note that "q/2" signifies an integer that is the closest to q/2.

In a ciphertext output process of S308, the ciphertext output part 230 outputs the ciphertext CT having as cipher elements the matrix $c_0$ calculated in S305, the matrix $c_{i,\gamma}$ calculated in S306, and the matrix $c'_j$ calculated in S307.

Figure 8:
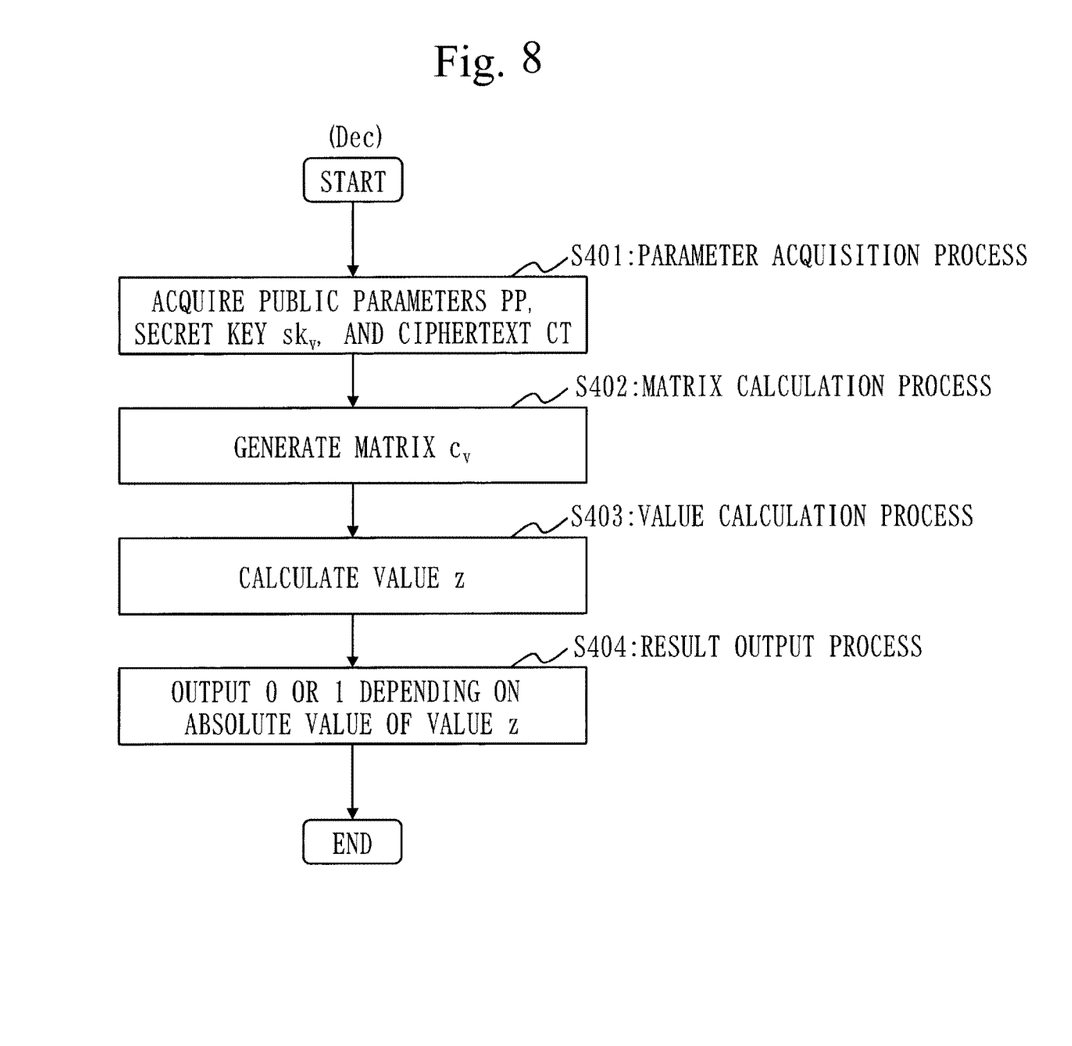
FIG. 8 is a flowchart illustrating a process of Dec algorithm according to Embodiment 1.

The process of Dec algorithm according to Embodiment 1 will be described with reference to FIG. 8.

As described above, Dec algorithm is executed by the decryption apparatus 300.

In a parameter acquisition process of S401, the parameter acquisition part 310 acquires the public parameters PP publicized by the parameter publicizing part 140. The parameter acquisition part 310 also acquires the secret key $sk_v$ outputted by the secret key output part 150. The parameter acquisition part 310 also acquires the ciphertext CT outputted by the ciphertext output part 230.

In a matrix calculation process of S402, the matrix calculation part 321 calculates a matrix $c_v$ as indicated by formula 14 with using the predicate vector v included in the secret key $sk_v$ acquired in S401 and the matrix $c_{i,\gamma}$ included in the ciphertext CT acquired in S401.

$$c_v := \sum_{i=1}^{L} \sum_{\gamma=0}^{k} v_{i,\gamma} c_{i,\gamma} \qquad \text{[Formula 14]}$$

In a value calculation process of S403, the value calculation part 322 calculates a matrix c by concatenating the matrix $c_0$ included in the ciphertext CT and the matrix $c_v$ calculated in S402. Namely, the value calculation part 322 calculates $c := [c_0 \| c_v]$.

The value calculation part 322 then calculates a value z by $z := c'_j - e^T c \mod q$ with using the matrix $c'_j$ included in the ciphertext CT, the vector e included in the secret key $sk_v$, and the matrix c.

In a result output process of S404, the result output part 323 outputs 0 if an absolute value $|z|$ of the value z calculated in S403 is smaller than q/4; otherwise, 1.

The noise vector X and the noise vector term x will each be expressed as "noise". Then, if the inner product of the predicate vector v and the attribute vector w is 0 ($v \cdot w = 0$), then $c_v := \sum_{i=1}^{L} \sum_{\gamma=0}^{k} v_{i,\gamma} c_{i,\gamma} = C_v^T s + \text{noise}$. Hence, $c := [c_0 \| c_v] = [A \| C_v]^T s + \text{noise} = A_v^T s + \text{noise}$. Since $A_v \cdot e = u_j$, accordingly $e^T c = e^T A_v^T s + \text{noise} = u^T s + \text{noise}$. Therefore, $z = M \cdot \text{"}q/2\text{"} + \text{noise}$ where "q/2" is an integer that is the closest to q/2.

The message M is 0 or 1, and noise is selected from $\phi_\alpha$ and is a small value. Therefore, it is possible to say that if the absolute value $|z|$ is smaller than q/4, then the message M is 0; otherwise, the message M is 1.

*Description of Effect*

As described above, the cryptographic system 10 according to Embodiment 1 realizes a functional encryption scheme that is based on the lattice theory. In particular, the cryptographic system 10 according to Embodiment 1 generates the secret key $sk_v$ having as a key element the vector e that satisfies a matrix target equation "$A_v \cdot e = u_j$" with using the matrix $u_j$ for the value j selected from the set N including a plurality of values.

Therefore, it is possible to prevent information from leaking undesirably from a ciphertext having an attribute that satisfies a condition for a secret key.

In the above functional encryption scheme, e and $u_j$ are each a vector. However, e and $u_j$ may be each a matrix depending on the algorithm to which the key technique is applied.

In the above description, a secret key is generated which has as a key element the matrix e satisfying the matrix target equation $A_Y \cdot e = u_j$ for the matrix $A_Y$, matrix e, and matrix $u_j$. The matrix $A_Y$, matrix e, and matrix $u_j$ may be replaced by elements in a function space. The matrix $A_Y$, the matrix e, and the matrix $u_3$ may be replaced by infinite-dimensional vectors.

In the above description, the matrix e is described as having a norm shorter than that of the matrix $A_Y$.

The matrix e is calculated by SampleLeft algorithm. With SampleLeft algorithm, the matrix e is selected from a Gaussian distribution $D_{A,\sigma}$ by sampling. Hence, the matrix e is distributed almost in accordance with the Gaussian distribution $D_{A,\sigma}$.

In this case, the standard deviation value $\sigma$ determines the substantial distribution width to $2\sigma\sqrt{(m+m_1)}$. The standard deviation value $\sigma$ is roughly equal to $O(\sqrt{(n \cdot (m+m_1))} \cdot \log q \cdot \log(m+m_1))$. Hence, when an appropriate constant c is used, the length of the matrix e is almost $c\sqrt{(n \cdot (m+m_1))} \cdot \log q \cdot \log(m+m_1)$ where $m_1$ is a positive integer.

Figure 9:
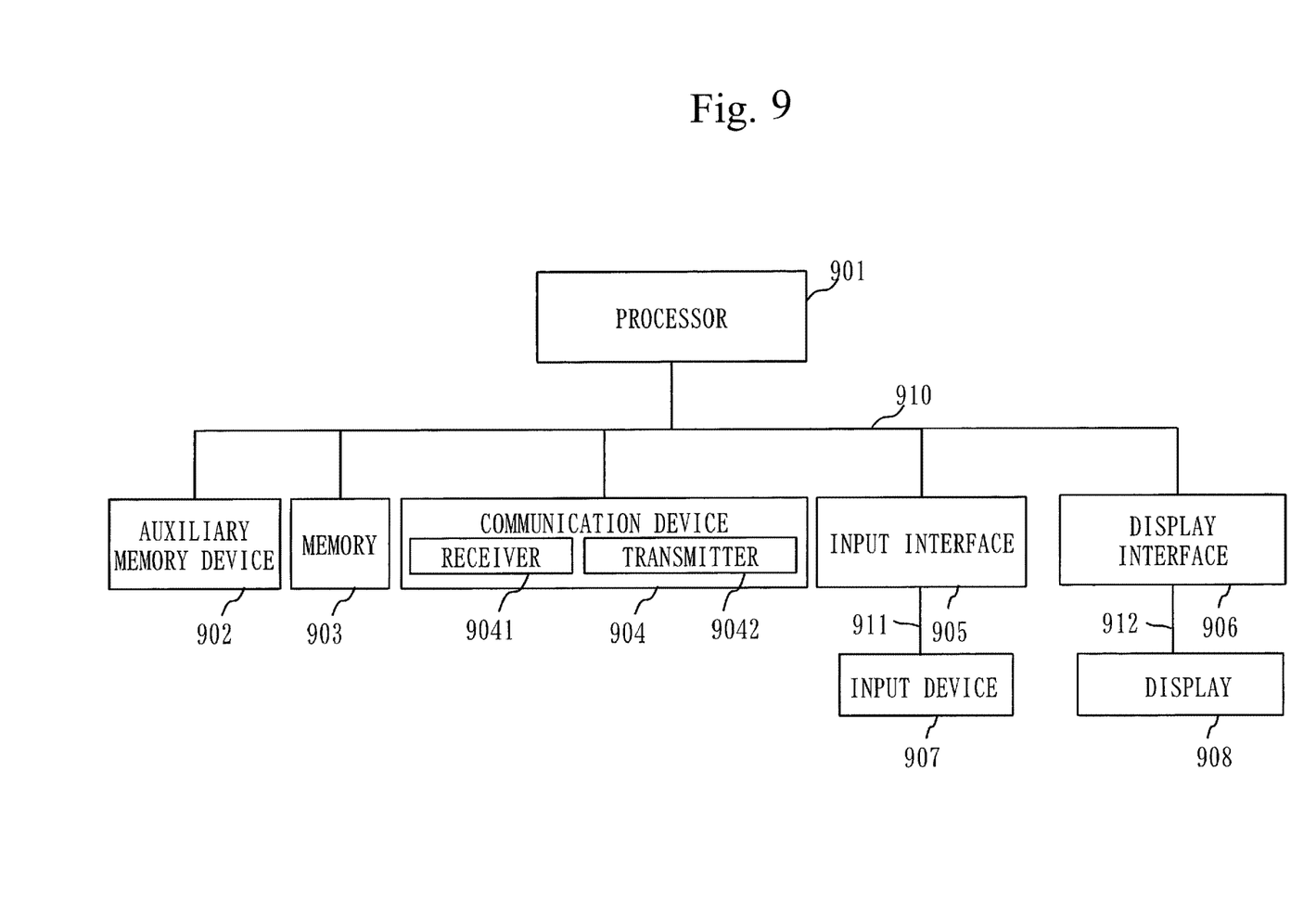
FIG. 9 is a diagram illustrating a hardware configuration example of the key generation apparatus 100, the encryption apparatus 200, and the decryption apparatus 300 according to Embodiment 1.

FIG. 9 is a diagram illustrating a hardware configuration example of the key generation apparatus 100, encryption apparatus 200, and decryption apparatus 300 according to Embodiment 1.

The key generation apparatus 100, the encryption apparatus 200, and the decryption apparatus 300 are each a computer.

The key generation apparatus 100, the encryption apparatus 200, and the decryption apparatus 300 are each provided with hardware devices such as a processor 901, an auxiliary memory device 902, a memory 903, a communication device 904, an input interface 905, and a display interface 906.

The processor 901 is connected to other hardware devices via a signal line 910 and controls these other hardware devices.

The input interface 905 is connected to an input device 907 via a cable 911.

The display interface 906 is connected to a display 908 via a cable 912.

The processor 901 is an IC (Integrated Circuit) which performs processing. The processor 901 is, for example, a CPU (Central Processing Unit), a DSP (Digital Signal Processor), or a GPU (Graphics Processing Unit).

The auxiliary memory device 902 is, for example, a ROM (Read Only Memory), a flash memory, or an HDD (Hard Disk Drive).

The memory 903 is, for example, a RAM (Random Access Memory).

The communication device 904 includes a receiver 9041 for receiving data and a transmitter 9042 for transmitting data. The communication device 904 is, for example, a communication chip or an NIC (Network Interface Card).

The input interface 905 is a port to which the cable 911 of the input device 907 is connected. The input interface 905 is, for example, a USB (Universal Serial Bus) terminal.

The display interface 906 is a port to which the cable 912 of the display 908 is connected. The display interface 906 is, for example, a USB terminal or an HDMI (registered trademark) (High Definition Multimedia Interface) terminal.

The input device 907 is, for example, a mouse, a keyboard, or a touch panel.

The display 908 is, for example, an LCD (Liquid Crystal Display).

The parameter acquisition part 110, the parameter publicizing part 140, the secret key output part 150, the parameter acquisition part 210, the ciphertext output part 230, and the parameter acquisition part 310 are implemented by the communication device 904. The parameter acquisition part 110, the parameter acquisition part 210, and the parameter acquisition part 310 may be implemented by the input interface 905 instead.

The result output part 323 is implemented by the display interface 906.

The auxiliary memory device 902 stores a program that realizes the function of the master key generation part 120, fundamental matrix selection part 121, random matrix selection part 122, random vector selection part 123, secret key generation part 130, vector decomposition part 131, predicate matrix generation part 132, key element generation part 133, ciphertext generation part 220, random matrix selection part 221, random number selection part 222, noise selection part 223, cipher element generation part 224, decryption part 320, matrix calculation part 321, and value calculation part 322 described above (the master key generation part 120, fundamental matrix selection part 121, random matrix selection part 122, random vector selection part 123, secret key generation part 130, vector decomposition part 131, predicate matrix generation part 132, key element generation part 133, ciphertext generation part 220, random matrix selection part 221, random number selection part 222, noise selection part 223, cipher element generation part 224, decryption part 320, matrix calculation part 321, and value calculation part 322 will be comprehensively expressed as "part" hereinbelow).

This program is loaded in the memory 903, read by the processor 901, and executed by the processor 901.

The auxiliary memory device 902 also stores an OS (Operating System).

The OS is loaded in the memory 903 at least partly. The processor 901, while executing the OS, executes the program that realizes the function of the "part".

FIG. 9 illustrates a single processor 901. The key generation apparatus 100, the encryption apparatus 200, and the decryption apparatus 300 may be each provided with a plurality of processors 901. The plurality of processors 901 may execute the program that realizes the function of the "part" in cooperation with each other.

Information, data, signal values, and variable values indicating the result of the process of the "part" are stored in the form of a file in the memory 903, the auxiliary memory device 902, or a register or cache memory in the processor 901.

The "part" may be provided as "circuitry". The "part" may be replaced by a "circuit", "stage", "procedure", or "process". The "circuit" and "circuitry" are a concept that involves not only the processor 901 but also other types of processing circuits such as a logic IC, GA (Gate Array), ASIC (Application Specific Integrated Circuit), or FPGA (Field-Programmable Gate Array).

REFERENCE SIGNS LIST

10: cryptographic system; 100: key generation apparatus; 110: parameter acquisition part; 120: master key generation part; 121: fundamental matrix selection part; 122: random matrix selection part; 123: random vector selection part; 130: secret key generation part; 131: vector decomposition part; 132: predicate matrix generation part; 133: key element generation part; 140: parameter publicizing part; 150: secret key output part; 200: encryption apparatus; 210: parameter acquisition part; 220: ciphertext generation part; 221: random matrix selection part; 222: random number selection part; 223: noise selection part; 224: cipher element generation part; 230: ciphertext output part; 300: decryption apparatus; 310: parameter acquisition part; 320: decryption part; 321: matrix calculation part; 322: value calculation part; 323: result output part

The invention claimed is:

1. A cryptographic system comprising:
processing circuitry configured to:
generate, as a secret key for an input parameter Y, a secret key including a matrix e as a key element, wherein a product of the matrix e and a matrix $A_Y$ determined by the input parameter Y forms a vector $u_j$ for a value j in a set [N] including a plurality of values, the vector $u_j$ being among a plurality of vectors u included in public parameters PP;
generate a ciphertext including cipher elements for respective values included in the set [N]; and
decrypt the ciphertext with using the secret key and the cipher element for the value j among cipher elements included in the ciphertext, wherein, since the ciphertext includes the cipher elements for respective values in the set [N] from which only the cipher element for the value j is decryptable by the secret key as a result of inclusion of the matrix e, the secret key is configured so as to prevent a leakage of information from the ciphertext, which is decryptable using the secret key, regarding an attribute of the ciphertext satisfying the secret key, said attribute being indicated by an attribute vector used to encrypt the ciphertext, wherein the vector $u_j$ is a member of the set $Z_q^n$, where $Z_q$ signifies an integer space modulo q, wherein the input parameter Y is a predicate vector and a member of the set $Z_q^L$, where $Z_q$ signifies an integer space modulo q, wherein the matrix $A_Y$ is a matrix and a member of the set $Z_q^{n \times 2m}$, where $Z_q$ signifies the integer space modulo q, and 2m represents the number of columns in the matrix $A_Y$, wherein the same value n represents the length of the vector $u_j$, the length of the predicate vector, and the number of rows in the matrix $A_Y$, and wherein the value of m or n is greater than 1.

2. The cryptographic system according to claim 1, wherein the matrix e has a norm shorter than a norm of the matrix $A_Y$ and a norm of the matrix $u_j$.

3. The cryptographic system according to claim 1, wherein the cipher elements for the respective values are generated each with using the matrix u for the corresponding value.

4. The cryptographic system according to claim 1,
wherein the matrix $A_Y$ is a matrix $A_v$ in which a predicate vector v being the input parameter Y is set, and
wherein the processing circuitry generates a ciphertext that includes a cipher element in which an attribute vector w is set, in addition to the cipher elements for the respective values.

5. The cryptographic system according to claim 4, wherein the processing circuitry
generates the matrix e indicated in formula 1, as the key element,
generates $c_0$ indicated in formula 2, $c_{i,\gamma}$ indicated in formula 3, and $c'_j$ indicated in formula 4, as the cipher elements, and
decrypts the ciphertext by conducting calculation indicated in formula 5, $$A_v \cdot e = u_j \bmod q, \quad \text{[Formula 1]}$$

$$A_v := [A \parallel C_v] \in Z_q^{n \times 2m},$$

$$A \in Z_q^{n \times m},$$

$$C_v := \sum_{i=1}^{L} \sum_{\gamma=0}^{k} v_{i,\gamma} A_{i,\gamma} \in Z_q^{n \times m},$$

$$v_i = \sum_{\gamma=0}^{k} v_{i,\gamma} \cdot 2^\gamma,$$

$$v := (v_1, \ldots, v_L),$$

where n is an integer not less than 1,
m is an integer not less than n,
q is an integer larger than 2,
L is an integer not less than 1, and
k is an integer not less than 1

$$c_0 := A^T s + X, \quad \text{[Formula 2]}$$

$$s \xleftarrow{U} Z_q^n,$$

$$X \xleftarrow{R} \overline{\varphi}_\alpha^m,$$

where $\overline{\varphi}_\alpha$ is a probability distribution over $Z_q := Z/qZ$
S is randomly selected from $Z_q^n$, and
X is randomly selected from $\overline{\varphi}_\alpha^m$ $$c_{i,\gamma} := (A_{i,\gamma} + 2^\gamma w_i B)^T s + R_{i,\gamma}^T X, \quad \text{[Formula 3]}$$

$$w := (w_1, \ldots, w_L),$$

$$B \xleftarrow{U} Z_q^{n \times m},$$

$$R_{i,\gamma}^T \in \{0, 1\}^{m \times m}$$

$$c'_j := u_j^T s + x + M \cdot \text{``}q/2\text{''} \in Z_q \text{ for } j \in [N], \quad \text{[Formula 4]}$$

$$x \xleftarrow{R} \overline{\varphi}_\alpha,$$

$$M \in \{0, 1\},$$

where "q/2" is an integer that is the closest to q/2

$$c_v := \sum_{i=1}^{L} \sum_{\gamma=0}^{k} v_{i,\gamma} c_{i,\gamma}, \quad \text{[Formula 5]}$$

$$c := [c_0 \parallel c_v],$$

$$z := c'_j - e^T c \pmod{q}.$$

6. A key generation apparatus comprising:
processing circuitry configured to:
acquire an input parameter Y and public parameters PP; and
generate a matrix e, as a key element of a secret key, wherein a product of the matrix e and a matrix $A_Y$ determined by the input parameter Y forms a vector $u_j$ for a value j in a set [N] including a plurality of values, the vector $u_j$ being among a plurality of vectors u included in the public parameters PP,
wherein, since the ciphertext includes the cipher elements for respective values in the set [N] from which only the cipher element for the value j is decryptable by the secret key as a result of inclusion of the matrix e, the secret key is configured so as to prevent a leakage of information from ciphertext, which is decryptable using the secret key, regarding an attribute of the ciphertext satisfying the secret key, said attribute being indicated by an attribute vector used to encrypt the ciphertext,
wherein the vector $u_j$ is a member of the set $Z_q^n$, where $Z_q$ signifies an integer space modulo q,
wherein the input parameter Y is a predicate vector and a member of the set $Z_q^L$, where $Z_q$ signifies an integer space modulo q, and
wherein the matrix $A_Y$ is a matrix and a member of the set $Z_q^{n \times 2m}$, where $Z_q$ signifies the integer space modulo q, and 2m represents the number of columns in the matrix $A_Y$,
wherein the same value n represents the length of the vector $u_j$, the length of the predicate vector, and the number of rows in the matrix $A_Y$, and
wherein the value of m or n is greater than 1.

* * * * *